United States Patent
So et al.

(10) Patent No.: US 10,484,148 B2
(45) Date of Patent: Nov. 19, 2019

(54) METHOD AND DEVICE FOR TRANSMITTING AND RECEIVING MULTIMEDIA DATA

(71) Applicants: Samsung Electronics Co., Ltd., Suwon-si, Gyeonggi-do (KR); UNIVERSITY-INDUSTRY COOPERATION GROUP OF KYUNG HEE UNIVERSITY, Yongin-si, Gyeonggi-do (KR)

(72) Inventors: Young-Wan So, Gunpo-si (KR); Kyung-Mo Park, Seoul (KR); Doug-Young Suh, Seongnam-si (KR); Yong-Woo Cho, Uiwang-si (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 7 days.

(21) Appl. No.: 15/319,231

(22) PCT Filed: Jul. 6, 2015

(86) PCT No.: PCT/KR2015/006954
§ 371 (c)(1),
(2) Date: Dec. 15, 2016

(87) PCT Pub. No.: WO2016/003250
PCT Pub. Date: Jan. 7, 2016

(65) Prior Publication Data
US 2017/0155478 A1    Jun. 1, 2017

(30) Foreign Application Priority Data
Jul. 4, 2014 (KR) .................. 10-2014-0083764

(51) Int. Cl.
*H04L 1/18* (2006.01)
*H04L 29/08* (2006.01)
(Continued)

(52) U.S. Cl.
CPC .......... *H04L 1/1864* (2013.01); *H04H 60/11* (2013.01); *H04L 1/0045* (2013.01);
(Continued)

(58) Field of Classification Search
CPC ... H04L 1/1864; H04L 1/0045; H04L 1/1812; H04L 29/08; H04N 21/236;
(Continued)

(56) References Cited

U.S. PATENT DOCUMENTS

| 7,672,250 B2 | 3/2010 | Czaja et al. |
| 2008/0215949 A1 | 9/2008 | Shin |

(Continued)

FOREIGN PATENT DOCUMENTS

| KR | 10-2008-0080872 A | 9/2008 |
| KR | 10-2013-0008438 A | 1/2013 |

(Continued)

*Primary Examiner* — Cynthia Britt
*Assistant Examiner* — Rong Tang
(74) *Attorney, Agent, or Firm* — Jefferson IP Law, LLP

(57) ABSTRACT

Provided are a method and a device for transmitting and receiving multimedia data. The present invention comprises: receiving of multimedia data and confirming of loss data; determining, with respect to the degree of the loss of the received data, of whether or not the lost data can be recovered by means of application layer forward error correction (AL-FEC); if data recovery by means of the AL-FEC is not possible, making of an automatic retransmission request (ARQ) with respect to the lost data; and receiving of data retransmitted with respect to the ARQ and recovering of the lost data.

16 Claims, 5 Drawing Sheets

(51) Int. Cl.
*H04N 21/236* (2011.01)
*H04L 1/00* (2006.01)
*H04H 60/11* (2008.01)
*H04N 21/24* (2011.01)
*H04N 21/4425* (2011.01)
*H04N 21/647* (2011.01)

(52) U.S. Cl.
CPC ............ *H04L 1/1812* (2013.01); *H04L 29/08* (2013.01); *H04N 21/236* (2013.01); *H04N 21/2404* (2013.01); *H04N 21/4425* (2013.01); *H04N 21/6473* (2013.01); *H04H 2201/37* (2013.01)

(58) Field of Classification Search
CPC ........... H04N 21/6473; H04N 21/4425; H04N 21/2404; H04H 2201/37
See application file for complete search history.

(56) References Cited

U.S. PATENT DOCUMENTS

| | | |
|---|---|---|
| 2011/0219279 A1 | 9/2011 | Abu-Surra et al. |
| 2013/0246846 A1* | 9/2013 | Oyman ............ H04W 4/06 714/18 |
| 2015/0006991 A1 | 1/2015 | Won et al. |
| 2015/0288553 A1* | 10/2015 | Qi ............ H03M 13/6306 375/340 |

FOREIGN PATENT DOCUMENTS

| | | |
|---|---|---|
| KR | 10-1220150 B1 | 1/2013 |
| KR | 10-2013-0018235 A | 2/2013 |
| KR | 10-2013-0086552 A | 8/2013 |

\* cited by examiner

METHOD AND DEVICE FOR TRANSMITTING AND RECEIVING MULTIMEDIA DATA

CROSS-REFERENCE TO RELATED APPLICATION(S)

This application is a U.S. National Stage application under 35 U.S.C. § 371 of an International application filed on Jul. 6, 2015, and assigned application number PCT/KR2015/006954, which claimed the benefit of a Korean patent application filed on Jul. 4, 2014, in the Korean Intellectual Property Office and assigned Serial number 10-2014-0083764, the entire disclosure of which is hereby incorporated by reference.

TECHNICAL FIELD

The present disclosure relates to a method and apparatus for transmitting and receiving multimedia data in a broadcasting and communication system.

BACKGROUND ART

Data congestion is becoming more and more intense due to the diversity of contents in communication systems and the increase of high capacity contents such as High Definition (HD) contents and Ultra High Definition (UHD) contents. Due to this situation, contents sent from a sender (for example, Host A) are not normally transmitted to a receiver (e.g., Host B), and a part of the content is lost on route.

In general, since data is transmitted in units of packets, loss of contents occurs in units of packets. Hereinafter, a packet is mixed and used with the same concept as data. The packet includes a block (payload), address information (e.g., a source address and a destination address), and management information (e.g., a header) of data to be transmitted. Therefore, when a packet loss occurs in the network, the receiver cannot receive the lost packet so that the data and management information in the lost packet cannot be known. Therefore, it causes deterioration of audio quality, degradation of video image quality or an image breaking, an omission of a subtitle, a loss of a file and the like making an inconvenience for a user.

For this reason, an Application Layer Forward Error Correction (AL-FEC) is required as a method for reconstructing data loss caused by a network. To this end, a method for configuring an FEC packet and transmitting and receiving the packet is required.

Meanwhile, as the convergence of broadcasting and communication proceeds, multimedia services through various media have been popularized. That is, services which use existing broadcasting media such as terrestrial, satellite, and a cable, are diversified based on a digital scheme, and simultaneously, mobile broadcast services such as Digital Multimedia Broadcasting (DMB), Digital Video Broadcasting-Handheld (DVB-H) and Advanced Television System Committee-Mobile/Handheld (ATSC-M/H) and converged services, such as an Internet Protocol TV (IPTV) and a smart TV, have appeared. In addition, the Advanced Television System Committee (ATSC) 3.0 standard is being discussed recently, and a technology for adaptively providing an optimal service to various terminals and a variable channel environment in a hybrid network environment of a broadcasting network and the Internet has been required.

SUMMARY

In accordance with an aspect of the present disclosure, a method and apparatus for a stable and highly reliable service when video data is serviced in real time or in a similar form in a hybrid network system is provided.

Further, in accordance with an aspect of the present disclosure, there is provided a method and apparatus for complexly using an AL-FEC technology and an automatic repeat request (ARQ) technology in order to minimize an error or loss of data transmitted through the hybrid network system.

Technical Solution

In accordance with an aspect of the present disclosure, there is provided a method of receiving multimedia data in a hybrid network system. The method includes: receiving multimedia data from a broadcast server and identifying lost data; determining whether reconstruction of the lost data is possible through an application layer forward error correction (AL-FEC) according to a degree of loss of the received data; requesting an automatic repeat request (ARQ) for the lost data to the broadband server when the reconstruction of the data is impossible through the AL-FEC; and receiving data retransmitted according to the ARQ request and reconstructing the lost data.

In accordance with another aspect of the present disclosure, there is provided an apparatus for receiving multimedia data in a hybrid network system. The apparatus includes: a transceiver configured to receive multimedia data from a broadcast server, request an automatic repeat request (ARQ) to a broadband server, and receive retransmitted data; at least one processor configured to identify lost data of the data received from the broadcast server, determine whether reconstruction of the lost data is possible through an application layer forward error correction (AL-FEC) according to a degree of loss of the received data, request the ARQ for the lost data to the broadband server when it is impossible to reconstruct the data through the AL-FEC, receive data retransmitted according to the ARQ request, and reconstruct the lost data.

In accordance with another aspect of the present disclosure, there is provided a method of transmitting multimedia data by a broadband server in a hybrid network system. The method includes: receiving multimedia data from a broadcast server; receiving an automatic repeat request (ARQ) for the multimedia data from a client; and generating or selecting symbols for data reconstruction based on information included in the ARQ request, and transmitting the symbols to the client together with an ARQ response.

In accordance with another aspect of the present disclosure, there is provided an apparatus for transmitting multimedia data in a hybrid network system. The apparatus includes: a transceiver configured to receive multimedia data from a broadcast server, receive an automatic repeat request (ARQ) for the multimedia data from a client, and transmit an ARQ response to the client; and at least one processor configured to generate or select symbols for data reconstruction based on information included in the ARQ request, and transmit the symbols to the client together with the ARQ response.

DETAILED DESCRIPTION

Figure 1:
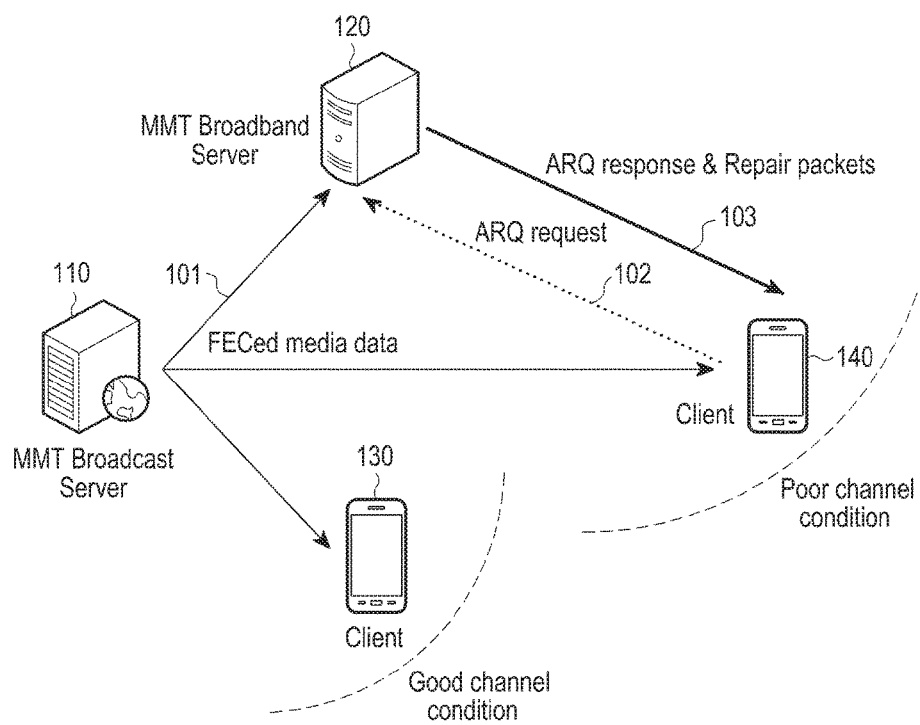
FIG. 1 illustrates an order of complex use of an AL-FEC technology and an ARQ technology in a hybrid network.

Hereinafter, embodiments of the present disclosure will be described in more detail with reference to the accompanying drawings so as to allow those skilled in the art to easily implement the present disclosure. However, the present disclosure may be implemented in various different forms and is not limited to embodiments described herein.

Further, parts irrelevant to the present disclosure are omitted in the drawings to make the present disclosure clear and the same reference numerals are designated to the same or similar components throughout the specification.

Throughout the specification and the claims, when it is described that a certain part includes a certain element, this means that the unit may further include any other element rather than exclude the any other element unless otherwise indicated.

Further, terms described later are defined in consideration of functions of the present disclosure, but may vary according to the intention or convention of a user or operator. Therefore, the definitions of the terms should be made based on the contents throughout the specification.

In the present specification, the use of an MPEG Media Transport (MMT) protocol as a transmission and application protocol will be described as an example. However, the present disclosure is not limited thereto, and it would be obvious to a person skilled in the art to apply the present disclosure even when using another protocol such as a TCP/IP, UDP/IP, and HTTP.

Next, terms to be used in the present disclosure will be arranged and described below.

Hybrid channel: a hybrid channel refers to a case in which data is transmitted through two or more different networks, and includes a co-existence network, for example, when a client accesses LTE (Long Term Evolution) and Wi-Fi simultaneously, a cloud network, a broadcast/broadband hybrid channel, a relay channel, a peer-to-peer (P2P) network, and the like. In this event, a broadcast server and a broadband server can be properly and effectively used for the communication scheme. A client receives media data to the broadcast server and performs retransmission of tailored advertisement and lost data. The data may be received from the broadband server.

Application Layer Forward Error Correction (AL-FEC): An error in data transmission means that data bits are changed from "0" to "1" or from "1" to "0", and means that it cannot be known where the data bits occurred. In most cases, packets with errors in an application layer are discarded without being transferred to an upper layer, and these packets in the application layer processes as lost packets. The loss means that the packets are discarded when the data is transmitted. Although it is possible to know which part the packet has been lost at a reception end, it is not possible to know which information has been lost. In this event, missing information is referred to as "Erasure". Packet loss on the Internet corresponds to Erasure. The AL-FEC is a technology for reconstructing lost packets rather than correcting a data error. A typical AL-FEC is a "Reed Solomon (RS)" code. k RS codes generates n-k repair packets with k data packets and transmits n packets to the client. A total of n data packets and a repair packet set refer to an Associated Group (AG). When receiving k or more packets among n packets, the client may reconstruct all k pieces of original data. The RS code is a very efficient code, but an algorithm is very complex, and the number of repair packets which can be made is limited. The total number n of the data packet and the repair packet cannot exceed $255=2^8-1$. A "rateless code" has been devised to complement characteristics of the RS code. The rateless code may generate almost infinite repair packets. The repair packets of the rateless code are simply generated based on "$2^q$ addition & multiple" calculation of the data packets. As a typical example of the rateless code, there is a "Raptor code" adopted as a standard of a Low Density Parity Code (LDPC) and a 3rd Generation Partnership Project Multimedia Broadcast Multicast Service (3GPP MBMS). The raptor code selects the data packets through a unique random pattern and performs $2^q$ addition & multiple operations to generate repair packets. Using these features, n may greatly increase according to a network situation or usage. Even when n increases unlike the RS code, the operation amount does not greatly increase. A position of the selected data packet is referred to as an edge, and different repair packets are generated according to the combination of edges. $2^q$ Position information of $2^q$ addition & multiple calculated data packets is referred to as edge information. Since k data packets may be selected or may not be selected, respectively (if subtracting a case in which one piece of data packet or less is selected), it is possible to generate 2k-k-1 repair packets. A unique number is assigned to the set of defined edges, and a Raptor encoder and a raptor decoder has the same edge table. The Rateless code makes it easy to create many different repair packets, so that it is possible to reduce the number of duplicated packets when the same information is transmitted in a communication channel having multipath. Therefore, it is a very useful method for transferring media information.

Automatic Repeat request (ARQ): an ARQ is a scheme of detecting a data error in a receiving side, and then notifying this to a transmitting side and requiring retransmission of the corresponding data. Further, the ARQ requires forward and reverse channels. Representative schemes of the ARQ will be described below.

Stop-and Wait ARQ scheme: is the simplest type of ARQ scheme, and a transmitting side transmits one block, waits until an acknowledge (ACK) or non-acknowledge (NAK) response arrives from the receiving side, and then retransmits the block. One buffer is required for transmitting and receiving sides and transmission efficiency is low.

Go-back, N-ARQ scheme: is an ARQ scheme of retransmitting a block having a firstly generated error, and all blocks thereafter, and the transmitting side requires enough buffers or the receiving side requires one buffer.

Selection ARQ scheme: is an ARQ scheme of retransmitting only the block in which an error is generated, and the receiving side requires enough buffers. The selection ARQ scheme is used when a there are lot of errors on a communication line.

Adaptive ARQ scheme: is an ARQ scheme which dynamically changes a length of a frame and can maximize transmission efficiency, but is not widely used due to a complex control procedure.

Hereinafter, a method of transmitting information on a server requesting ARQ in a hybrid network and a method of, in a hybrid network, transmitting information on a time point when the ARQ is requested and data to be retransmitted will be described with reference to embodiments of the present disclosure. Furthermore, a technology which can be used for QoS enhancement and highly reliable transmission technology by applying the information to the MPEG Media Transport (MMT) standard is provided.

An embodiment of the present disclosure proposes a method of including an ARQ retransmission request server information in a signaling technology for the AL-FEC and an ARQ request time point and ARQ method in the case of using the AL-FEC and the ARQ in combination.

According to the embodiment of the present disclosure, for higher reliability and stable multimedia service, the client determines whether lost data can be reconstructed by only the AL-FEC according to the degree of loss of received data. Further, when the data can be reconstructed through only the AL-FEC, the ARQ is not requested. Only when it is not possible, only required data is retransmitted and reconstructed through the ARQ.

Packets, which are encoded by the AL-FEC and then are transmitted, are encoded and transmitted in an associated group unit. The client performs AL-FEC decoding in this group unit. When the amount of received packets is less than k (the number of symbols), the decoding is impossible. Therefore, when a packet of the next associated group has been received, the client identifies the amount of packets of the same associated group received so far, and determines that the decoding is impossible when the amount is less than K.

In the case of a real-time service, the client needs to reconstruct the packets received within the appropriate service time, and therefore, when the retransmission request is required, it is judged whether the retransmission request and the retransmission data reception are possible within the corresponding service time before the retransmission request. In the case of the MMT, it is possible to determine a time in/out of the data using information of a field such as fixed end-to-end delay information (fixed_end_to_end_delay) or maximum transmission delay information (max_transmission_delay) in a hypothetical receiver buffer model (HRBM) signaling message and Round Trip Time (RTT) information. The HRBM message is a message used for transmitting a transmission delay value between a transmitting end and a receiving end and memory requirement information from the transmitting end to the receiving end for efficient operation of the transmitting end and the receiving end in the broadcasting environment.

When requesting retransmission of a lost packet through ARQ, especially when using the Selection ARQ scheme, the client requests information of the lost packet and receives the lost packet. However, in the embodiment of the present disclosure, with respect to only a repair symbol additionally required when the client reconstructs data through the AL-FEC in the decoding process, the retransmission is requested to the server without using the method as described above. In this event, when requesting retransmission of only the amount of the required repair symbol instead of requesting a specific repair symbol, the ARQ retransmission server retransmits only symbols (source symbol or repair symbol) required to reconstruct additional data for the corresponding associated group.

Further, in the embodiment of the present disclosure, in order to solve a loss occurring when the client receives data transmitted through a hybrid network, an AL-FEC technology, which is a forward error correction coding technology used in an application layer, and an ARQ technology, which is a retransmission request technology for data having the loss and the error.

FIG. 1 illustrates an example of a hybrid network according to an embodiment of the present disclosure.

In the case of a wireless channel environment, the network status can change rapidly with time. In general, when the loss is not large, all lost data can be reconstructed through AL-FEC. However, when the loss rapidly occurs, or when a large loss occurs beyond the AL-FEC reconstruction performance, it is impossible to reconstruct all the lost data through AL-FEC. Further, since a broadcasting network performs transmission only in one direction, it is difficult for the transmitting side to know the network status of the receiving side, and it is difficult to use the ARQ method as a countermeasure against data loss because the transmitting side cannot receive feedback information from the receiving side. In this event, countermeasures for the loss are prepared in the forward direction using the AL-FEC technology. However, as described above, when loss of data, the quantity of which exceeds the AL-FEC reconstruction performance occurs, the lost data cannot be reconstructed. Therefore, in the embodiment of the present disclosure, there is provided a method of reconstructing lost data using the ARQ technology through an intermediate node of a network or a broadband server of a hybrid channel capable of receiving feedback information transmitted from a client.

As shown in FIG. 1, an MMT broadcast server 110 transmits AL-FEC-encoded media data to an MMT broadband server 120 and clients 130 and 140 through a minimum broadcast network (101). However, when a data loss occurs beyond the extent that data can be reconstructed through the AL-FEC according to client's situations and network conditions, the client 140 in a location where the channel environment is not good performs an ARQ retransmission request for the lost data to the MMT broadband server 120 (102). The MMT broadband server 120 receiving the ARQ retransmission request transmits an ARQ response and a repair packet for reconstructing the lost data to the client 140 that has performed the ARQ retransmission request (103). In this event, the client 140 should receive URL (Uniform Resource Locator) information for the broadband server 120 capable of requesting the ARQ retransmission of the lost multimedia data from the broadcast server 110 through the MMT FEC signaling.

Figure 2:
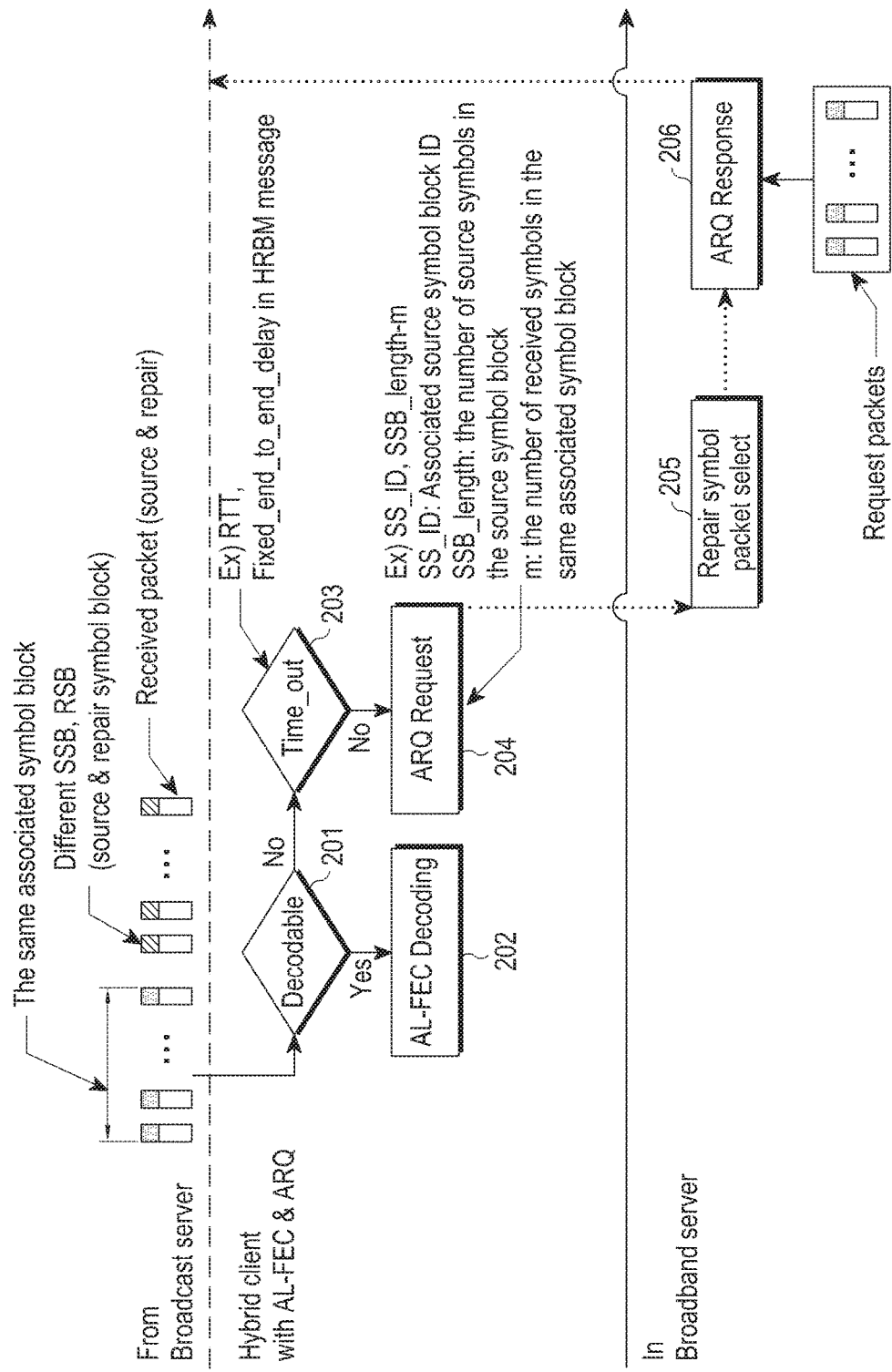
FIG. 2 illustrates a procedure of requesting and re-receiving an ARQ by a client.

FIG. 2 illustrates a procedure of requesting and re-receiving an ARQ by a client according to an embodiment of the present disclosure.

Referring to FIG. 2, a procedure for proceeding to a retransmission request by a client according to an embodiment of the present disclosure will be described below.

Firstly, the client determines whether packets received from a broadcast server can be reconstructed through an AL-FEC (201).

Since the AL-FEC encoding scheme forms one AG (a source symbol ID SS_ID in the case of MMT) to perform encoding, decoding is performed in units of data classified into the AG when the client performs decoding. Therefore, the client identifies the AG of the received packets and determines that the received packets until the AG is changed are one AG, and determines whether the corresponding packets belonging to the AG can be reconstructed.

The client determines whether the number of symbols (source symbols) of packets belonging to one received AG is less than the minimum number k required for the reconstruction. When the number of symbols of packets belonging to one received AG is less than K, the client determines that the packets cannot be reconstructed.

When the AL-FEC decoding is possible, the client decodes the received packets without ARQ request and consumes the corresponding media (202).

When packet reconstruction is impossible through the AL-FEC, the client is ready to make an ARQ request (203).

In the case of a non-real-time service, the ARQ request is always performed because it can be serviced after receiving retransmission data and reconstructing packets without regard to time. Meanwhile, in the case of a real-time service, since the packets are retransmitted and reconstructed through the ARQ request to be serviced within a proper time, the client first determines whether the ARQ request is performed before performing the ARQ request. That is, the client determines whether the packets can be received by performing the ARQ request in a time (RTT-decoding time) in consideration of an RTT, which is the time until the ARQ is requested and the data is received, and decoding time. In the case of the MMT, the client may determine time in/out using the fixed_end_to_end_delay field information in the HRBM signaling message. The client determines that the corresponding AG is not used in the case of the time-out and determines that the ARQ request is performed only in the case of the time-in.

When determining that the ARQ request is performed, the client performs the retransmission request for the corresponding packet to a broadband server capable of performing the ARQ request (204). For the ARQ request, the client should know information (i.e., URL information) of a position of the broadband capable of performing the ARQ request as described above, and this information may be acquired from the broadcast server through an FEC signaling message or a separate message.

Further, according to the embodiment of the present disclosure, when performing the ARQ request, the client does not feed information of the lost packet back unlike the existing ARQ, calculates the number of repair symbols required for the number of symbols to be larger than or equal to k in order to decode AG information of the lost packet and a corresponding AG through the AL-FEC, and transmits the calculated numbers to the broadband server.

In the case of the MMT, information transmitted to the broadband server when the ARQ request is performed is SS_ID and (SSB_Length-m) corresponding to the AG information, wherein SSB_Length corresponds to a length of a source symbol block and corresponds to k which is the number of symbols, and m corresponds to the number of already received symbols. Further, the SSB_Length information and m may be transmitted to the broadband server, respectively.

The broadband server analyzes the ARQ request from the client, generates or selects an additional repair symbol in the corresponding AG, and retransmits the generated or selected repair symbol to the client together with the ARQ response (205-206). The client combines the repair symbol retransmitted from the broadband server and the already received AG data, and decodes it through the AL-FEC to consume a corresponding media.

Hereinafter, syntax for, in the MMT, utilizing a data reconstruction and retransmission method according to the embodiment of the present disclosure will be described in more detail with reference to Table 1 below. Specifically, a field required to perform a data reconstruction and retransmission method according to the embodiment of the present disclosure are shown in a bold type in Table 1 below.

TABLE 1

| Syntax | Values | No. of bits | Mnemonic |
|---|---|---|---|
| AF_message( ) { | | | |
|   message_id | | 16 | uimsbf |
|   version | | 8 | uimsbf |
|   length | | 16 | uimsbf |
|   message_payload { | | | |
|     number_of_packet_id | N1 | 7 | uimsbf |
|     delay_constrained_ARQ_flag | | 1 | uimsbf |
|     ARQ_feedback_timestamp | | 32 | uimsbf |
|     Hybrid_ARQ_flag | | | |
|     for(i=0;i<N1;i++){ | | 1 | uimsbf |
|     if(Hybrid_ARQ_flag == 1) | | | |
|     { | | 16 | uimsbf |
|       Associated_group_ID | | 32 | uimsbf |
|       Number_of_Repair_symbols | | | |
|     } | | | |
|     else | | | |
|     { | | 16 | |
|       packet_id | | 32 | uimsbf |
|       packet_sequence_number | | 8 | uimsbf |
|       masklength | | | uimsbf |
|       if(delay_constrained_ARQ_flag==1 | | 16 | |
| ) | | | uimsbf |
|         arrival_deadline | | | |
|       for(i=0; i<masklength; i++) | | | |
|       { | | 8 | uimsbf |
|         mask_byte | | | |
|       } | | | |
|     } | | | |
|   } | | | |
| } | | | |

When requesting retransmission through ARQ according to the embodiment of the present disclosure, an information field for distinguishing an ARQ scheme according to the embodiment of the present disclosure from an existing ARQ scheme is required, and, in order to use the ARQ scheme as described above, the client calculates the number of repair symbols required to be k or more symbols to decode the AG information and the corresponding AG through AL-FEC, and transmits the calculated number to the broadband server. In Table 1, it is identified whether the ARQ scheme is a hybrid ARQ according to the embodiment of the present disclosure in an existing ARQ feedback message ($AF_{13}$ message), and an if syntax for identifying additional information in the case of hybrid ARQ is added. The filed for distinguishing the ARQ scheme is indicated by Hybrid_ARQ_flag, the AG information is indicated by Associated_group_ID, and the number of repair symbols required for retransmission is indicated by Number_of_Repair_symboles. Since Hybrid_ARQ_flag indicates whether a hybrid ARQ scheme is used, 1 bit is sufficient, and Associated_group_ID may be identical to SS_ID in the MMT FEC signaling message. Also, Number_of_Repair_symbols may be calculated as (SSB_Length-m).

Figure 3:
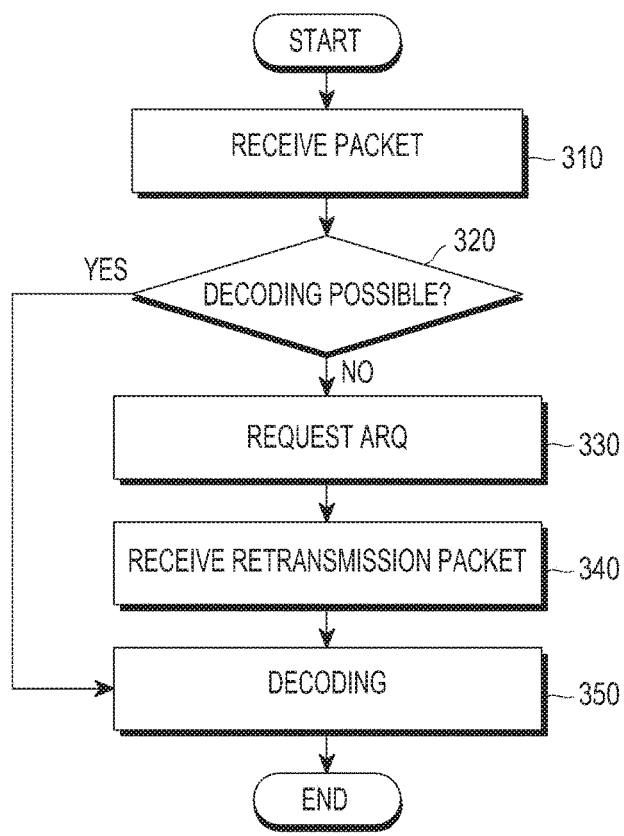
FIG. 3 is a flow chart illustrating an operation of a reception apparatus according to an embodiment of the present disclosure.

FIG. 3 is a flowchart illustrating an operation of a reception apparatus according to an embodiment of the present disclosure.

Referring to FIG. 3, a reception apparatus receives packets for a multimedia service from a broadcast server (310), and determines whether the received packets can be reconstructed through the AL-FEC (320). As described above, whether the packet can be reconstructed or not is determined based on the number of symbols of packets belonging to one AG among the packets received so far. When the number of symbols, which is the minimum number required for the reconstruction, is larger than or equal to k, the packet can be reconstructed. When the number of symbols is less than k, the reconstruction is impossible. When the AL-FEC decoding is possible, the reception apparatus performs decoding for packets received without an ARQ request (350). When the packet reconstruction is impossible through the AL-FEC, the reception apparatus requests the ARQ request to a broadband server corresponding to acquired URL information through an FEC signaling message from a broadcast server (330). In this event, as described above, the ARQ request is always performed in the case of the Non-real-time service, and in the case of a real-time service, packets are retransmitted through the ARQ request within a proper time and be reconstructed to perform the ARQ request according to whether the service is possible. An operation of receiving the packets through the ARQ request within the proper time, reconstructing the packets, and determining whether the service is possible may be performed by the transmission apparatus according to the implementation. The ARQ request may include AG information of lost packets, and the number of repair symbols required to allow the number of symbols to be k or more in order to decode the corresponding AG through the AL-FEC. Thereafter, the reception apparatus receives the repair symbol for the ARQ request from the broadband server (340), sums data of the already received AG data with data of the retransmitted repair symbol, and then performs decoding the data through the AL-FEC (350).

Figure 4:
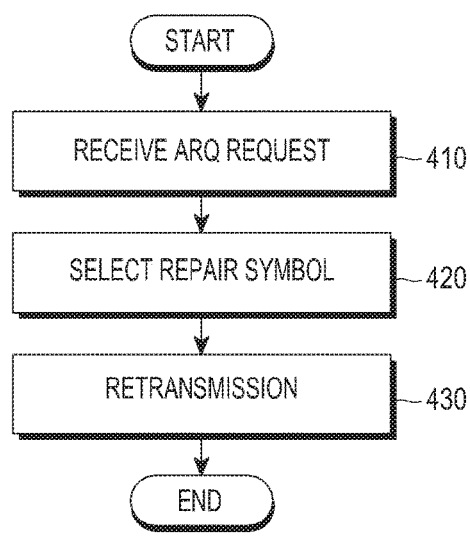
FIG. 4 is a flowchart illustrating an operation order of a transmission apparatus according to an embodiment of the present disclosure.

FIG. 4 is a flowchart illustrating an operation of a transmission apparatus according to an embodiment of the present disclosure.

Referring to FIG. 4, the transmission apparatus is a broadband server, receives an ARQ request from a client, and identifies the number of repair symbols required to allow the number of symbols to be k or more in order to decode information included in a received ARQ request message, that is, the AG information of lost packets and a corresponding AG through AL-FEC (410). Further, the transmission apparatus generates or selects a repair symbol for the ARQ request based on the identified information (420), and retransmits the repair symbol to the client together with an ARQ response (430).

Figure 5:
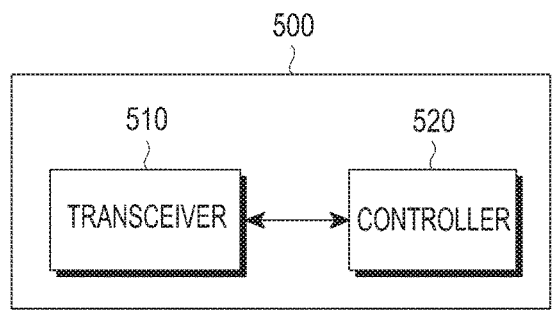
FIG. 5 is a block diagram briefly illustrating a configuration of a transmission apparatus according to an embodiment of the present disclosure.

FIG. 5 is a block diagram briefly illustrating a configuration of a transmission apparatus according to an embodiment of the present disclosure.

Referring to FIG. 5, a transmission apparatus 500 may be a broadcast server or a broadband server, and includes a transceiver 510 and a controller 520. The transceiver 510 transmits or receives a signal to or from a reception apparatus (client), transmits multimedia data to the reception apparatus, and receives a retransmission request for the multimedia data from the reception apparatus according to the embodiment of the present disclosure. The controller 520 controls all operations of transceiver 510, and analyzes the ARQ request received from the reception apparatus to control the transceiver 510 to perform a retransmission for only an additional repair symbol in the corresponding AG according to the embodiment of the present disclosure.

Figure 6:
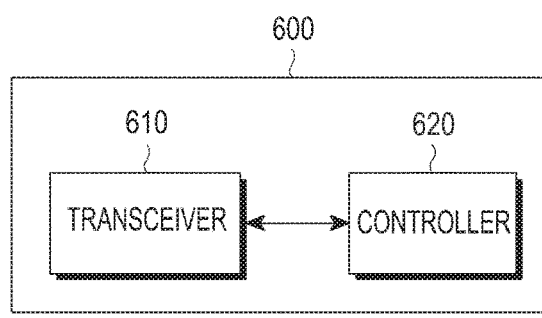
FIG. 6 is a block diagram briefly illustrating a configuration of a reception apparatus according to an embodiment of the present disclosure.

FIG. 6 is a block diagram briefly illustrating a configuration of a transmission apparatus according to an embodiment of the present disclosure.

Referring to FIG. 6, a terminal includes a transmission unit 600, a transceiver 610, and a controller 620. The transceiver 610 transmits or receives a signal to or from a transmission apparatus (a broadband server or a broadcast server). According to the embodiment of the present disclosure, the transceiver 610 receives multimedia data to the transmission apparatus and transmits a retransmission request for the multimedia data to the transmission apparatus. A controller 620 controls all operations of the transceiver 610. According to the embodiment of the present disclosure, the controller 620 determines whether received data packets can be reconstructed through an AL-FEC, and determines whether an ARQ request is to be performed when the reconstruction is impossible. Further, when determining that the ARQ request is to be performed, the controller controls the transceiver 610 to perform a retransmission request to a broadband server in which the ARQ request can be performed.

According to the embodiment of the present disclosure described above, when video data is serviced in a real-time or in a similar form in a hybrid wireless network, an AL-FEC technology technique and an ARQ technology are mixed and used for a stable and highly reliable service. Therefore, AL-FEC-encoded media data may be received through the broadcast server, and retransmitting and re-receive the ARQ through the broadband server to increase a reception reconstruction rate. Further, it is possible to overcome bad network conditions between the broadcast server and the client and it is possible to cope with sudden loss during communication with the server. Further, when the AL-FEC is used as a type of fountain code, during the request of the ARQ retransmission, only the minimum amount of repair packets required for reconstruction may be transmitted and retransmitted without needing to transmit information on which packet is the lost specific packet. Therefore, since it is not necessary that information on which packet is the lost specific packet is distinguished and then the packet is transmitted, the ARQ request can be made faster than before.

Further, when the AL-FEC is used as a type of fountain code, only the minimum repair packets required for reconstruction may be transmitted in the ARQ retransmission response, and a rate of overlapping with the previously received data can be reduced.

It should be noted that things illustrated in the drawings have no intent to limit the scope of the disclosure. That is, all configurations or steps of the operations illustrated in FIGS. 1 to 4 should not be interpreted as essentially structural elements for carrying out the present disclosure, and variations and modifications of the present disclosure may be implemented without departing from the scope of the present disclosure.

The above-described operations of the transmission apparatus and the reception apparatus can be implemented by providing a memory apparatus storing a corresponding program code in an arbitrary configuration unit in the transmission apparatus or the reception apparatus. That is, the controller of the smart module or device may perform the above described operations by reading and executing the program code stored in the memory device by means of a processor or a central processing unit (CPU).

Those skilled in the art can appreciate that it is possible to implement the present disclosure in another specific form without changing the technical idea or the indispensable characteristics of the present disclosure. Accordingly, it should be understood that the embodiments described above are merely exemplary and are not limited. The scope of the present disclosure is defined by the appended claims to be described below, rather than the above detailed description, and it will be apparent to those skilled in the art that the scope of the present disclosure should be construed as covering all modifications or variations derived from the meaning and scope of the appended claims and their equivalents.

The invention claimed is:

1. A method of receiving multimedia data in a hybrid network system, the method comprising:
   receiving, by a transceiver, multimedia data from a broadcast server;
   identifying lost data in the multimedia data;
   determining, by at least one processor, whether reconstruction of the lost data is possible through an application layer forward error correction (AL-FEC) based on the lost data;
   when the reconstruction of the multimedia data is not possible through the AL-FEC while receiving the multimedia data from the broadcast server, requesting, by the at least one processor to a broadband server, an automatic repeat request (ARQ) for a retransmission of the lost data in the multimedia data through an intermediate node of a network in the hybrid network system while receiving the multimedia data from the broadcast server;
   receiving, by the transceiver from the broadband server, retransmitted data corresponding to the lost data that is retransmitted based on the ARQ; and
   reconstructing the lost data based on the retransmitted data.

2. The method as claimed in claim 1, wherein the determining of whether the reconstruction is possible comprises:
   determining that the reconstruction is possible when a number of symbols belonging to one group of received packets is less than a predetermined number, and
   determining that the reconstruction is impossible when the number of symbols belonging to the one group of the received packets is larger than or equal to the predetermined number.

3. The method as claimed in claim 1, wherein the requesting of the ARQ comprises, when a multimedia service corresponds to a real-time service, requiring the ARQ, receiving the retransmitted data in a predetermined time on a basis of time required until receiving the retransmitted data and a time required for decoding, and determining that the ARQ is requested when the reconstruction is possible.

4. The method as claimed in claim 1, wherein the ARQ includes group information of the lost data and information on a number of repair symbols required to decode data included in the group information.

5. The method as claimed in claim 1, further comprising:
   receiving, by the transceiver from the broadcast server, an address of the broadband server which is to transmit the ARQ.

6. The method as claimed in claim 1, wherein the retransmitted data includes a repair symbol.

7. An apparatus for receiving multimedia data in a hybrid network system, the apparatus comprising:
   a transceiver;
   at least one processor; and
   a memory communicatively coupled to the at least one processor and configured to store instructions thereon,
   wherein the at least one processor, upon execution of the instructions, is configured to:
      control the transceiver to receive multimedia data from a broadcast server,
      identify lost data in the multimedia data,
      determine whether reconstruction of the lost data is possible through an application layer forward error correction (AL-FEC) based on the lost data,
      when the reconstruction of the multimedia data is not possible through the AL-FEC while receiving the multimedia data from the broadcast server, control the transceiver to request an automatic repeat request (ARQ) for a retransmission of the lost data in the multimedia data through an intermediate node of a network in the hybrid network system while receiving the multimedia data from the broadcast server,
      control the transceiver to receive retransmitted data corresponding to the lost data based on the ARQ from a broadband server, and
      reconstruct the lost data based on the retransmitted data.

8. The apparatus as claimed in claim 7, wherein the at least one processor is further configured to:
   determine that the reconstruction is possible when a number of symbols belonging to one group of received packets is less than a predetermined number, and
   determine that the reconstruction is impossible when the number of symbols belonging to the one group of the received packets is larger than or equal to the predetermined number.

9. The apparatus as claimed in claim 7, wherein, when a multimedia service corresponds to a real-time service, the at least one processor is further configured to require the ARQ, receive the retransmitted data in a predetermined time on a basis of time required until receiving the retransmitted data and a time required for decoding, and determine that the ARQ is requested when the reconstruction is possible.

10. The apparatus as claimed in claim 7, wherein the ARQ includes group information of the lost data and information on a number of repair symbols required to decode data included in the group information.

11. The apparatus as claimed in claim 7, wherein the transceiver is further configured to receive an address of the broadband server which is to transmit the ARQ from the broadcast server.

12. The apparatus as claimed in claim 7, wherein the retransmitted data includes a repair symbol.

13. A method of transmitting multimedia data by a broadband server in a hybrid network system, the method comprising:
   receiving, by a transceiver, multimedia data from a broadcast server;
   receiving, by the transceiver from a client device, an automatic repeat request (ARQ) for the multimedia data through an intermediate node of a network in the hybrid network system;
   generating or selecting, by at least one processor, symbols for reconstruction of lost data in the multimedia data based on information included in the ARQ; and
   while the client device receives the multimedia data from the broadcast server, transmitting the symbols together with an ARQ response to the client device.

14. The method as claimed in claim 13, wherein the ARQ includes group information of the lost data and information on a number of repair symbols required to decode data included in the group information.

15. An apparatus for transmitting multimedia data in a hybrid network system, the apparatus comprising:
   a transceiver;
   at least one processor; and
   a memory communicatively coupled to the at least one processor and configured to store instructions thereon,
   wherein the at least one processor, upon execution of the instructions, is configured to:
      control the transceiver to receive multimedia data from a broadcast server,
      control the transceiver to receive an automatic repeat request (ARQ) for the multimedia data from a client device through an intermediate node of a network in the hybrid network system, generate or select symbols for reconstruction of lost data in the multimedia data based on information included in the ARQ, and while the client device is receiving the multimedia data from the broadcast server, transmit the symbols together with an ARQ response to the client device.

16. The apparatus as claimed in claim 15, wherein the ARQ includes group information of the lost data and information on a number of repair symbols required to decode data included in the group information.

* * * * *